United States Patent
Noss (10) Patent No.: US 10,054,706 B2
(45) Date of Patent: Aug. 21, 2018

(54) NODE POSITION CORRECTION IN PRESENCE OF TIME DISTORTIONS

(71) Applicant: CGG SERVICES SA, Massy (FR)

(72) Inventor: Tony Noss, Orpington Kent (GB)

(73) Assignee: CGG SERVICES SAS, Massy (FR)

( * ) Notice: Subject to any disclaimer, the term of this patent is extended or adjusted under 35 U.S.C. 154(b) by 20 days.

(21) Appl. No.: 15/124,881

(22) PCT Filed: Mar. 13, 2015

(86) PCT No.: PCT/IB2015/001025
§ 371 (c)(1),
(2) Date: Sep. 9, 2016

(87) PCT Pub. No.: WO2015/140644
PCT Pub. Date: Sep. 24, 2015

(65) Prior Publication Data
US 2017/0017006 A1    Jan. 19, 2017

Related U.S. Application Data (60) Provisional application No. 61/955,246, filed on Mar. 19, 2014.

(51) Int. Cl.
*G01V 1/38* (2006.01)

(52) U.S. Cl.
CPC .......... *G01V 1/3835* (2013.01); *G01V 1/3852* (2013.01)

(58) Field of Classification Search
CPC ..................... G01V 1/3835; G01V 1/3852
USPC ........................................................ 367/19
See application file for complete search history.

(56) References Cited

U.S. PATENT DOCUMENTS

| | | | |
|---|---|---|---|
| 4,229,809 A * | 10/1980 | Schwalbe | G01S 15/74 367/106 |
| 5,128,904 A | 7/1992 | Chambers | |
| 5,497,356 A * | 3/1996 | Norton, Jr. | G01S 5/30 367/130 |
| 5,696,733 A | 12/1997 | Zinn et al. | |
| 2012/0287753 A1 | 11/2012 | Hatchell et al. | |

OTHER PUBLICATIONS

International Search Report in related International Application No. PCT/IB2015/001025, dated Nov. 23, 2015.

(Continued)

*Primary Examiner* — Daniel L Murphy
(74) *Attorney, Agent, or Firm* — Patent Portfolio Builders PLLC (57) ABSTRACT

Seismic data recorded on an ocean bottom node (OBN) is used to determine observed direct arrival times at the OBN from a set of seismic source shots having a time span that is only a portion of an entire span time for a shot line. The observed direct arrival times for each shot in the set of seismic source shots are compared statistically with a plurality of predicted direct arrival times for each shot in the set of seismic source shots to derive a statistical measure of differences across all shots. Each predicted direct arrival time is associated with a unique proposed position of the OBN. The unique proposed position that minimizes the statistical measure of differences between the observed direct arrival times and the predicted direct arrival times is selected for each shot in the set of shots as a corrected OBN position.

20 Claims, 5 Drawing Sheets

(56) References Cited

OTHER PUBLICATIONS

Written Opinion of the International Searching Authority in related International Application No. PCT/IB2015/001025, dated Nov. 23, 2015.
J. Cantillo et al., "Ocean Bottom Nodes (OBN) Repeatability and 4D", SEG Technical Program Expanded Abstracts 2010, pp. 61-65.
P. Docherty et al., "Ambiguities in Direct Arrival Time Inversion for Ocean Bottom Nodes", 74th EAGE Conference & Exhibition incorporating SPE EUROPEC 2012, Copenhagen, Denmark, Jun. 4-7, 2012.
B. Olofsson et al., "Ensuring Correct Clock Timing in Ocean Bottom Node Acquisition", SEG Annual Meeting, Denver Colorado, 2010, pp. 172-176.

\* cited by examiner

NODE POSITION CORRECTION IN PRESENCE OF TIME DISTORTIONS

CROSS REFERENCE TO RELATED APPLICATIONS

This application is a National Stage of International Application No. PCT/IB2015/001025, filed Mar. 13, 2015, which claims priority and benefit from U.S. Provisional Patent Application No. 61/955,246, filed Mar. 19, 2014, for "Node Position Correction in Presence of Time Distortions (XYPOS)" the entire content of which are incorporated in their entirety herein by reference.

TECHNICAL FIELD

Embodiments of the subject matter disclosed herein generally relate to methods and systems for seismic data processing and, more particularly, to mechanisms and techniques for processing of ocean bottom node (OBN) seismic data.

BACKGROUND

Ocean bottom node (OBN) seismic data are acquired using a group of nodes, which are autonomous units, that are placed at locations on the sea floor to record and store the full seismic wave-field (pressure and shear) resulting from a number of shots provided along a shot line or series of shot lines at or near the surface of the water. In order to obtain the full seismic wave-field data, each node is currently physically retrieved, and the stored data are downloaded for evaluation. Future technical developments may permit remote data transfer negating the need to physically retrieve the node until operationally warranted. Current methods for acquiring and analyzing the data result in inaccuracies in the known position of the node, in particular for deep water seismic surveys, and the timing of the recorded data. Such inaccuracies include the node geographical position (X, Y & Z), time errors related to the internal clock within each node and environmental aspects such as time distortion due to water column and tidal variations within the duration of the survey.

Accurate determination of node location is important in analyzing the recorded seismic data. Typically, node position is initially identified using satellite or interferometric methods generally related to the ship and remotely operated vehicle (ROV) used to deploy each node. An autonomous underwater vehicle (AUV) may be employed in place of an ROV. This may be supported by similar identification of node position when each node is recovered. These typical methods are prone to inaccuracies. In addition, as nodes are autonomous units, each node has an internal clock to describe chronological time. However, these internal clocks do not keep time to the degree of accuracy required for seismic data and often drift from the true time. Since each node has an individual clock, this clock drift varies from node to node. Resolving inaccuracies in the fidelity of the on-board clock or other factors that relate to accurate timing of the data is important in processing node data. Unfortunately, these various factors that cause timing infidelity may interact in a non-linear manner, causing problems in resolving one from the other.

An existing method for determining node position errors in deeper water relies on time-slices through the direct arrival times describing circles around the node location. With knowledge of the shot locations that contribute to the node, the coordinates of the center of all such circles around nodes' location can be calculated. These circle centers generate a probability function with statistical parameterization that defines the location of each node. Other existing methods include simultaneous inversion using single value decomposition for node position, clock drift and water velocity as described in Docherty, P. and Hays, D., Ambiguities in direct arrival time inversion for ocean bottom nodes, 74$^{th}$ EAGE conference and exhibition, (2012) and a method of mapping direct arrival times of adjacent nodes to the same time. The results of these existing methods for determining node position errors can be influenced by other errors, particularly timing errors due to clock-drift. Conversely, methods for determining the clock-drift suffer in the presence of node position errors negating the ability to satisfactorily resolve one or the other. Therefore, improved methods for determining node positioning errors from recorded seismic data even in the presence of clock drift are desired.

SUMMARY

Exemplary embodiments are directed to systems and methods for identifying and resolving node position errors using recorded seismic data from ocean bottom nodes (OBNs) even in the presence of other time distortions within the recorded seismic data. The method statistically compares observed direct arrival times from seismic source shots with predicted direct arrival times at a plurality of unique proposed positions of an OBN in order to minimize the differences between the observed and predicted direct arrival time and to identify a proposed position that provides this minimized difference statistically across all shots in all shot lines chosen for comparison. The shots in any given shot line that are chosen for comparison represent a subset of all shots in that given shot line and cover only a portion of the entire time span associated with that given shot line. The duration of the entire time span for any portion of each shot line is short enough to decouple the effects of node position error on arrival time from other timings errors such as clock drift while providing a sufficient number of shots to provide the desired statistical comparison.

One exemplary embodiment is directed to a method for ocean bottom node position correction that used seismic data recorded on an ocean bottom node to determine observed direct arrival times at the ocean bottom node from a set of seismic source shots comprising a time span that is only a portion of an entire span time for a shot line containing the set of seismic source shots. In one embodiment, the set of seismic source shots is selected such that all shots in the set of seismic source shots are located within a pre-determined distance from the ocean bottom node. This pre-determined distance can be set empirically based on a depth of water in which the ocean bottom node is located. Alternatively, the pre-determined distance is set to obtain an number of shots in the set of seismic source shots sufficient to express a sufficient statistical measure of differences across all shots.

The observed direct arrival times for each shot in the set of seismic source shots are compared statistically with a plurality of predicted direct arrival times for each shot in the set of seismic source shots to derive a statistical measure of differences across all shots. Each predicted direct arrival time is associated with a unique proposed position of the ocean bottom node. In one embodiment, the statistical measure of differences is a standard deviation of all differences across all shots in the set of seismic source shots between the observed direct arrival time for each shot in the set of seismic source shots and each one of the plurality of predicted direct arrival times.

Comparing the observed direct arrival times for each shot in the set of seismic source shots statistically with the plurality of predicted direct arrival times further includes identifying a nearest offset shot in each set of seismic source shots. The nearest offset shot is a shortest distance to the ocean bottom node. In addition, each difference between the observed direct arrival time for each shot and each one of the plurality of predicted direct arrival times is computed with reference to the nearest offset shot. Computing each difference with reference to the nearest offset shot includes calculating a time difference between each observed direct arrival time and each predicted direct arrival time and then computing the difference relative to the nearest offset shot direct arrival time before computing the statistical measure for each one of the plurality of predicted direct arrival times.

The unique proposed position that minimizes the statistical measure of differences between the observed direct arrival times and the predicted direct arrival times for each shot in the set of shots is selected as a corrected ocean bottom node position. In one embodiment, each unique position includes two orthogonal co-planar coordinates, for example, polar coordinates. In one embodiment, each unique position further also includes a third coordinate orthogonal to a plane containing the two orthogonal co-planar coordinates. The third coordinate represents a vertical coordinate and includes a component expressing an average velocity through a water column in which the ocean bottom node is located. Alternatively, the third coordinate represents a vertical coordinate and includes a component expressing a depth dependent velocity through a water column in which the ocean bottom node is located.

In one embodiment, refined unique proposed locations of the ocean bottom node are generated. The corrected ocean bottom node position is refined using the refined proposed locations of the ocean bottom node iteratively in the steps of comparing the observed direct arrival times and selecting the unique proposed position. In one embodiment, a location of the corrected ocean bottom node position is refined by interpolation based on the statistical measure of differences from a group of unique proposed positions in a vicinity of the corrected ocean bottom node position.

In one embodiment, using the seismic data includes using seismic data recorded by the ocean bottom node to determine observed direct arrival times at the ocean bottom node from a plurality of sets of seismic source shots. Each set of seismic source shots is derived from a separate shot line in a plurality of shot lines. The observed direct arrival times are compared with the plurality of predicted direct arrival times statistically by deriving a separate statistical measure of differences across all shots for each set of seismic source shots. Selection of the unique proposed position includes selecting the unique position that minimizes the statistical measures of differences between the observed direct arrival times and the predicted direct arrival times across all sets of seismic source shots.

In one embodiment, each set of seismic source shots is selected such that all shots in each set of seismic source shots are within a pre-determined distance from the ocean bottom node. This pre-determined distance defines a desired geometric shape around the ocean bottom node, and each shot line in the plurality of shot lines traverses a distinct path through the desired geometric shape. In one embodiment, the plurality of shot lines represents parallel lines, and the number of shots in each set of seismic source shots varies with distance from the ocean bottom node along a cross line extending perpendicular to the plurality of shot lines. In one embodiment, the statistical measure of differences includes a separate standard deviation of all differences across all shots in each set of seismic source shots between the observed direct arrival time for each shot in each set of seismic source shots and each one of the plurality of predicted direct arrival times and a weighted average standard deviation across all sets of seismic source shots. Each set of seismic source shots includes a weight equal to a number of shots in that set of seismic source shots.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In this detailed description and the Figures, geographically linear and parallel shot lines are discussed. This is the most prevalent form of shot line utilized in the acquisition of surface seismic data. It also lends itself naturally to the definition of shot line segments detailed herein. However, shot lines can actually be in many shapes; they may be spiral, a closed geometric shape, a circle, concentric circles or concentric squares. They could be curved, "V" shaped or "U" shaped. Each shot line includes a distinct or unique plurality of seismic shot sources. The shot lines can overlap or crisscross, form a grid etc. The invention is not limited to shot lines being straight lines or lines being parallel lines (Euclidean parallel).

Exemplary embodiments correct for ocean bottom node (OBN) position errors by utilizing direct arrival data for only a portion of the shots in a given shot line in order to decouple timing errors caused by inaccuracies in node position from timing errors caused by other factors such as clock drift and water column statics. The selected size of the portions of the shot lines that are utilized, which can be referred to as the dimension over which statistical comparisons are made, in conjunction with the point of reference used in the statistical comparison, facilitates the desired decoupling.

Figure 1:
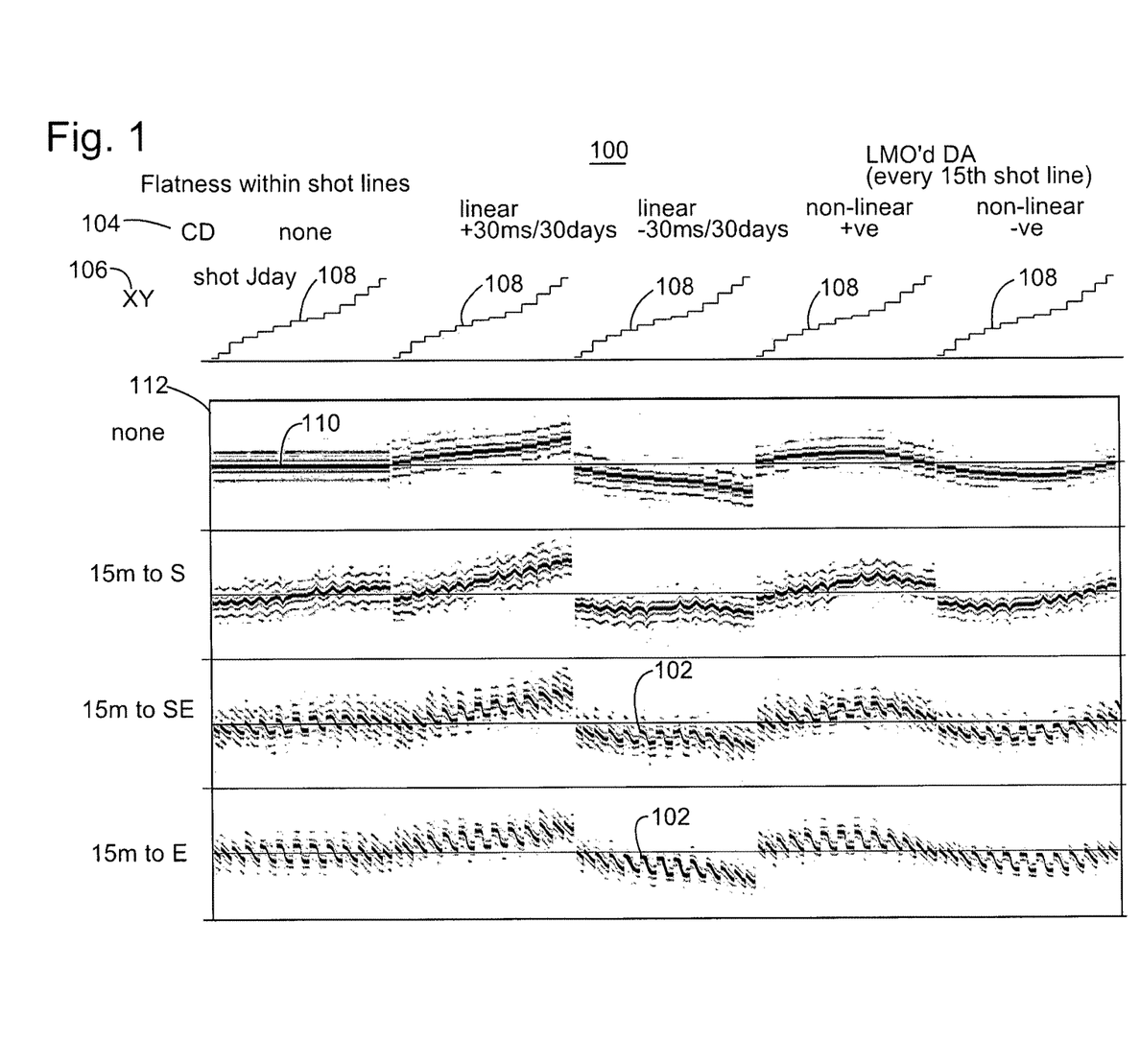
FIG. 1 is a graph illustrating the effects of clock drift and ocean bottom node position errors on direct arrival times.

Referring initially to FIG. 1, a graph 100 illustrates the effects on direct arrival seismic data recorded at an ocean bottom node (OBN) that are caused by changes in clock drift 104 within an OBN and position changes of the OBN in two dimensions (XY) 106 for a series of shot lines 108 containing a plurality of seismic source shots. With correct node XYZ position, i.e., no XYZ offset and no clock drift, the direct arrival is devoid of various errors arising from, for example, node position, clock drift and water column statics when evaluated within the shot line as illustrated in the flat direct arrival line 110.

Various changes in the clock drift, i.e., increasing or decreasing linearly or increasing or decreasing non-linearly, without any positioning errors as illustrated in the top line, while causing the line to rise or dip shot line to shot line, do not produce any changes of significance in the "flatness" or thickness of the direct arrival line within each shot line as illustrated moving across the top of the graph. However, changes in the position of the OBN, i.e., XY position changes moving down through the graph, cause the direct arrival line to be distorted while the effects caused by clock drift remain the same. This represents a distortion in time within a given shot line that is not related to clock drift. Exemplary embodiments take advantage of these time distortions within a shot line. While a portion of a single shot line may be sufficient for the analysis, preferably, portions of a plurality of shot lines are used.

Figure 5:
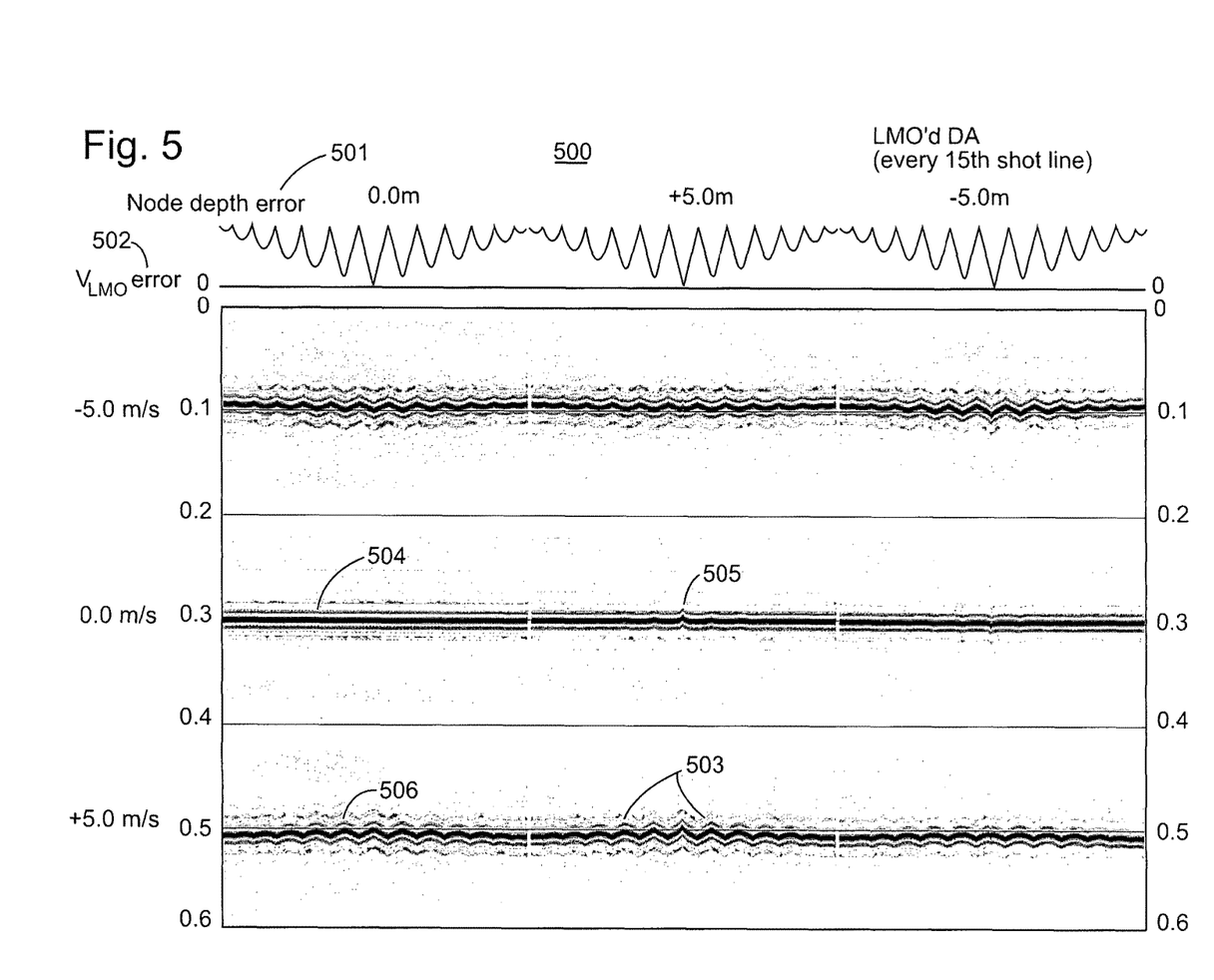
FIG. 5 is a graph illustrating the effects of ocean bottom node depth and water velocity errors on direct arrival times.

Referring to FIG. 5, a graph 500 illustrates the effects on direct arrival seismic data recorded at an OBN that are caused by position changes in a third dimension (Z) 501 and inaccuracies in water velocity, $V_W$, information 502 for a series of shot lines 503 containing a plurality of seismic source shots. With correct node depth and $V_W$ and devoid of other errors such as node XY position error or clock-drift etc., the direct arrival is devoid of error as illustrated in the flat direct arrival line 504. Errors in the node depth give rise to perturbations in the shape of the direct arrival 505. Errors in $V_W$ also give rise to perturbations in the direct arrival time 506. These represent a distortion in time in addition to those distortions in time arising from such things as node XY position error and clock drift.

Figure 2:
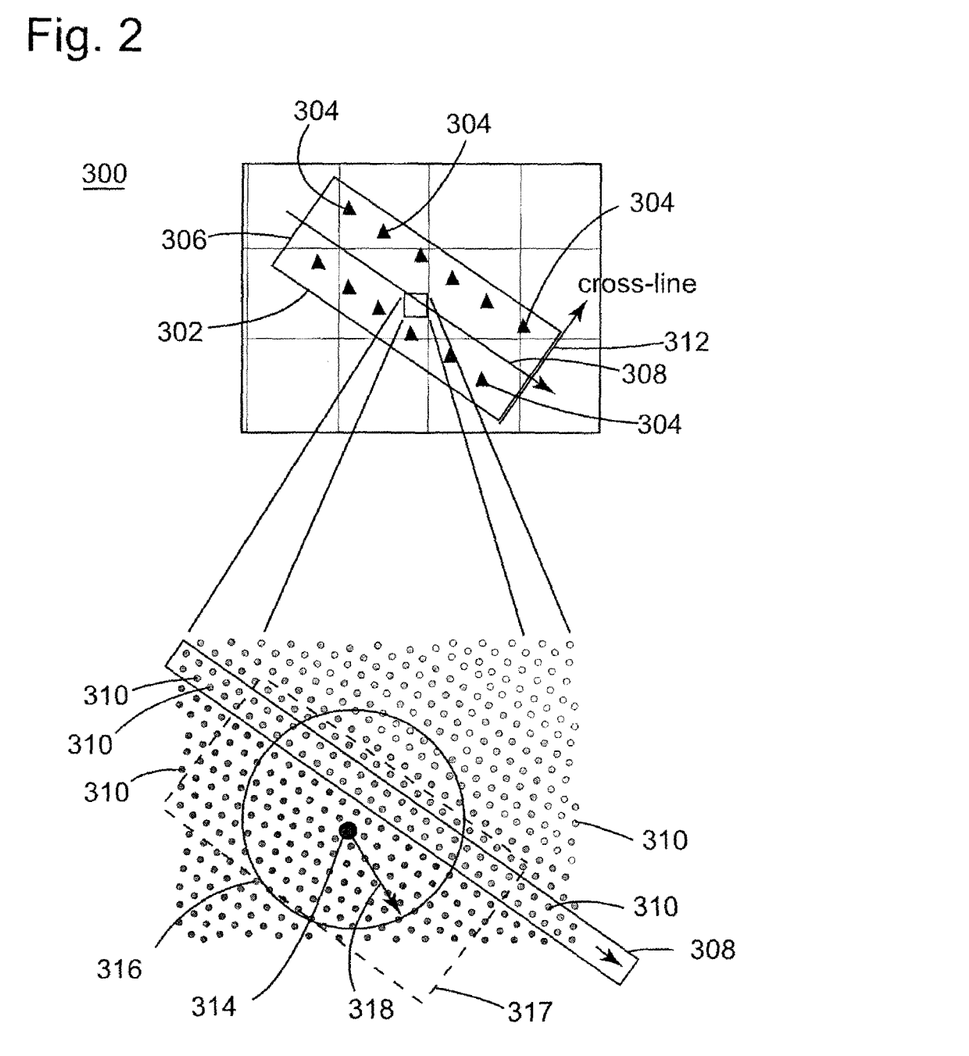
FIG. 2 is a representation of one embodiment of a layout of an ocean bottom node survey including a shot line containing a plurality of shots and a pre-determined radial offset distance.

Referring to FIG. 2, an exemplary arrangement for a seismic survey 300 is illustrated where a plurality of OBNs 304 are placed on the ocean or sea floor in a desired arrangement within a given area 306. Suitable OBNs are known and available in the art. In general, an OBN is an autonomous self-contained seismic data sensing and recording unit that is deployed from a surface vessel or remotely operated vehicle (ROV). The OBN records and stores seismic data, e.g., direct arrivals, reflected data and refracted data, until the OBN is retrieved or runs out of power. The seismic data are currently obtained by physically retrieving the OBN and downloading the stored or recorded seismic data but the data might be retrieved through remote data transfer.

The seismic data are generated by shots produced at or near the surface of the water along one or more shot lines 308. Suitable methods for generating shots are known in the art. In general, a shot line is a series of sequential shots delivered while the mechanism generating the shots traverses along a given line. In one embodiment, the chronological time interval between shots is short, of the order of tens of seconds, e.g., 12 seconds for a 30 m shot interval with the source vessel traveling at 2.5 m/s. A typical vessel speed is of the order of 2 to 2.5 m/s. To cover the desired area 306, a plurality of distinct, and in this example parallel linear, shot lines are used. The cross-line 312 or cross direction is defined as a direction across or perpendicular to the shot lines.

A given shot line 308 produces a plurality of shots 310 along its entire length or over the entire span time associated with that shot line. As illustrated for the purpose of this example, a flip-flop seismic source shot configuration is used that includes in a given shot line two seismic sources spaced 50 meters apart laterally and alternatively producing shots every 25 m, i.e., 50 m between shots for a given source. While a flip-flop configuration is illustrated, other forms of shot geometry can be applied. Each shot produces a direct arrival wave at the OBN contained in the recorded seismic data. The direct arrival pick times, e.g., the onset arrival times of the direct arrivals, are determined from the seismic data. The picks may be referenced from various datum planes, e.g., acquisition datum or, time after reduction for differential travel time in the water column, i.e. after linear or hyperbolic move-out. Absolute travel time is not required provided relative time difference is preserved.

The portion of set of seismic source shots in a given shot line that are utilized for the statistical comparison are all seismic source shots that fall within a pre-determined distance 318 from a given OBN 314. In one embodiment, the pre-determined distance is expressed as radial offset distance and is determined empirically based on the depth of water in which the ocean bottom node is located. In general, deeper water facilitates longer pre-determined shot to node distances. For areas with significant water depth variation, a smallest feasible offset can be used, provided this does not overly constrain the number of shots in the deeper water. In general, a sufficient number of shots are desired in each shot line to express a resulting shape in the statistical measure of direct arrival (DA) time differences across all shots in a given shot line that captures the variation in DA shape. In general, at higher offset distances the influence of node position error diminishes, and therefore, these higher offset distances are not included. This maximum distance is dependent on the magnitude of the node position error relative to water depth but would be unlikely to exceed 3000 m for maximum depths of water currently encountered in oil/gas related seismic surveys. For shallow bodies of water, sufficient DA data might not be available, as the effects of other seismic data interfere with DA data. In such cases, various methods or techniques available in the art (e.g. FK filtering) may be employed to overcome this limitation such that an offset range appropriate for statistical stability can be realized.

This pre-determined radial offset distance describes a resulting shape or analysis range 316 around the given OBN. As illustrated, this range is circular with the OBN 314 located at the center of the circle. However, other shapes such as square or rectangular 317 can be used, with the pre-determined XY distances adjusted to describe the desired analysis range. For a rectangular shape, the longer dimension is generally arranged parallel to the shot lines with the shorter length arranged parallel to the cross-line. A more complex description of the range of shots to be included in the statistical analysis can be employed. Within the given range, the offset for any shot is the surface (XY) distance from the seismic source producing that shot to the OBN. In one embodiment, the very near offset traces may be excluded from the analysis, a shape often described as "doughnut", for various reasons including but not limited to such things as noise contamination or amplitude clipping of the direct arrival in very shallow water where the node may be too close to the seismic source. In another embodiment, the offset may be the distance including a Z dimension and might also include velocity information concerning the water column plus the earth at or near the water bottom thereby facilitating a more automated specification of the offset range to use in the analysis for any node. The shortest offset in any given shot line is referred to as the nearest offset shot.

Figure 3:
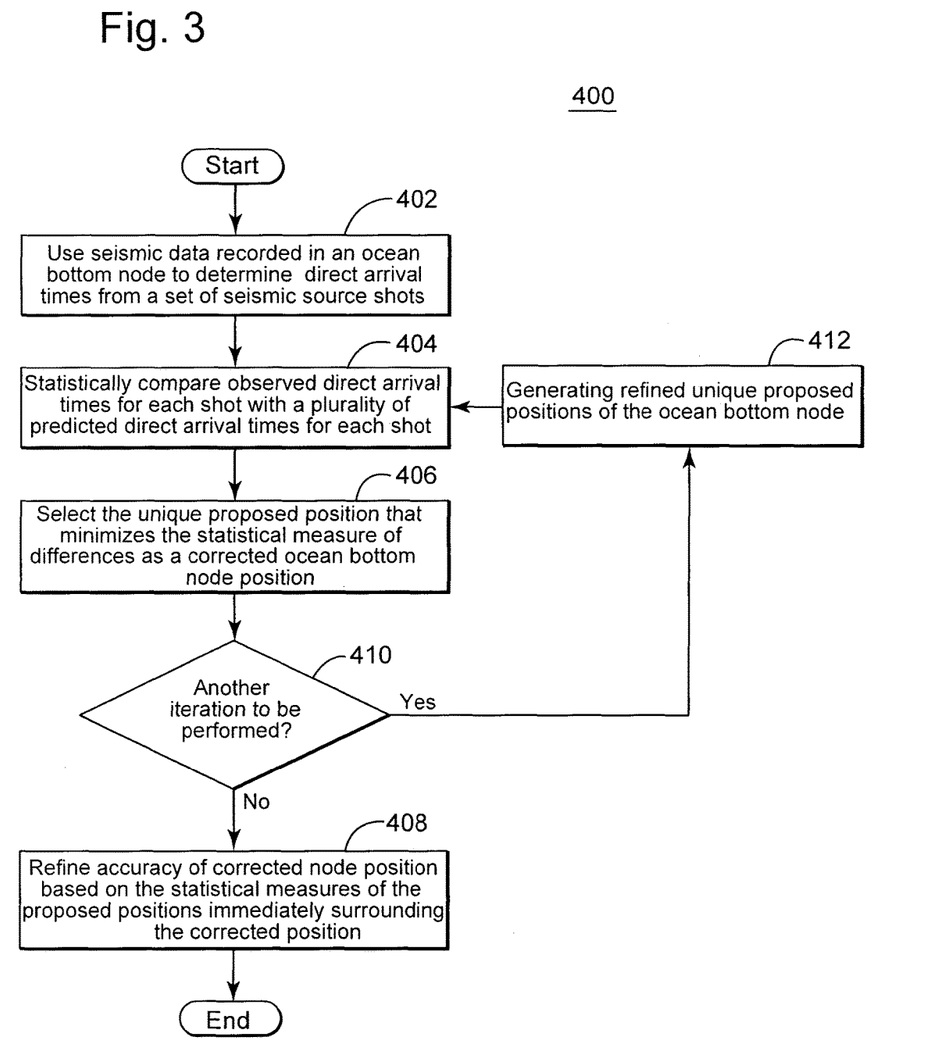
FIG. 3 is a flow illustrating an embodiment of a method for correcting ocean bottom node location using a portion of the shots in a shot line.

Referring to FIG. 3, an exemplary embodiment of a method for ocean bottom node position correction 400 is illustrated. In one embodiment, seismic data recorded on an ocean bottom node (OBN) are used to determine observed direct arrival times at the ocean bottom node from a set of seismic source shots for a given shot line 402. As multiple shot lines are used in a given seismic survey in the area of the OBN, preferably, the seismic data recorded on the OBN is used to determine observed direct arrival times at the ocean bottom node from a plurality of sets of seismic source shots. Each set of seismic source shots is derived from a separate shot line in a plurality of shot lines. In general, the direct arrival time observations need only to be relative, not absolute, i.e. the observations do not have to describe a specific part of the direct arrival waveform, just be consistent, for example always on the onset time, or always on the absolute maximum amplitude of the direct arrival waveform. In addition, the direct arrival time observations can be referenced to various datums. They might be the true travel time in the water column or they might be reduced with reference to the predicted direct arrival travel time. The latter, as shown in FIG. 1, being more conducive to visualization of the issue. In summary the observed times need to describe the shape of the direct arrival time not necessarily the true direct arrival time.

In general, each set of seismic source shots has a shot time span that is only a portion of an entire span time for the shot line that contains that set of seismic source shots. This time span is long enough to provide the desired number of shots and direct arrivals for adequate statistical comparisons and short enough to prevent undesirable influences from other timing errors such as clock drift or interferences from other seismic data such as reflections, water bottom multiples and refractions. For example, the time span can be up to about 1 or 2 hours. In one embodiment, the number of shots in each set of seismic source shots is equal, e.g. as is the likely case for rectangular limitation of shots in the analysis. Alternatively, the number of shots varies across the sets of seismic source shots, e.g. as is the likely case for radial offset limitation of shots in the analysis.

In one embodiment, a given set of seismic source shots is determined such that all shots in the given set of seismic source shots are within a pre-determined radial offset distance from the ocean bottom node. This pre-determined radial offset distance can be set empirically based on a depth of water in which the ocean bottom node is located, e.g., longer radial offsets for deeper water. In addition, the pre-determined radial offset distance can be set to obtain a desired minimum number of shots in any given set of seismic source shots that is sufficient to express a sufficient statistical measure of differences across all shots in that set of seismic source shots. In general, calculation of time-deviations or other statistics within the short sections provides significantly reduced sensitivity to longer-term sources of timing infidelity such as clock-drift.

For a plurality of shot lines, a plurality of sets of seismic source shots is identified. Therefore, each set of seismic source shots is identified such that all shots in any given set of seismic source shots are within the pre-determined radial offset distance from the ocean bottom node. In general, this radial offset defines or traces a desired geometric shape around the ocean bottom node. Suitable geometric shapes include, but are not limited to, circles, rectangles and squares. Based on the desired geometric shape, more complicated descriptions or definitions of the radial offset are used. Given this geometric shape, each shot line in the plurality of shot lines traverses a distinct path through the desired geometric shape. The set of seismic source shots in a given shot line contains all shots that fall within the geometric shape as the shot line traverses across the geometric shape. In one embodiment, the plurality of shot lines are parallel lines, and the number of shots in each set of seismic source shots varies with distance from the ocean bottom node along a cross line extending perpendicular to the plurality of shot lines, e.g., shot lines farther away from the OBN traverse a smaller portion of the geometric shape or have less shots within the pre-determined radial offset distance.

Having obtained one or more sets of seismic source shots, the observed direct arrival times for each shot in the set of seismic source shots are compared statistically with a plurality of predicted direct arrival times for each shot in the set of seismic source shots 404 to derive a statistical measure of differences across all shots in a given set of seismic source shots or for a given shot line. Preferably, all of the direct arrival times associated with all of the shots are used. The number of direct arrival times utilized is generally not decimated, e.g., utilizing only every second or third shot. Each predicted direct arrival time is associated with a unique proposed node position, i.e., proposed as an alternative or correction to an initially determined or current location of the ocean bottom node. Predicted times are calculated based on the known location of the seismic source shot, the unique proposed position, the known time of the shot and the average velocity through the water column. In one embodiment a more complex description of the velocity through the water column may be employed.

In one embodiment, each unique proposed position includes two orthogonal co-planar coordinates, e.g., XY, describing a location of the OBN. Suitable orthogonal co-planar coordinates include polar coordinates. In addition, a third coordinate can be included (Z) that is orthogonal to the plane containing the two orthogonal co-planar coordinates. Suitable three coordinate systems include the Cartesian coordinate system (XYZ). In one embodiment, this third coordinate represents a vertical coordinate. In one embodiment, the third coordinate includes a component expressing an average velocity through the water column, $V_W$, in which the ocean bottom node is located as the Z component and the average velocity through the water column are moderately coupled. Alternatively, both the two and three coordinate systems can be coupled to a depth variant velocity. The proposed unique positions may be expressed as absolute coordinates or as differences relative to an initial position. This initial position could be the initially determined or current location of the ocean bottom node.

For a plurality of shot lines, the statistical comparison of the observed direct arrival times with the plurality of predicted direct arrival times includes deriving a separate statistical measure of differences across all shots for each set of seismic source shots. In one embodiment for either a single shot line or a plurality of distinct shot lines, suitable statistical measures include the standard deviation in time differences for direct arrivals across all shots in a given set of seismic source shots. Other statistical comparison methods can also be used, such as area under a time "error" curve or a form of normalization of the standard deviation. Therefore, a standard deviation of all direct arrival time differences across all shots in the set of seismic source shots between the observed direct arrival time for each shot in the set of seismic source shots and each one of the plurality of predicted direct arrival times is determined. These standard deviations, one for each set of seismic source shots and proposed node positions, yield a graph across all given sets of seismic source shots. The shape of this graph indicates the accuracy of a given proposed unique position to an actual position of the OBN. Graphs with higher peaks or points of inflection are not desired. A flatter graph across all sets of shots indicates a better match. More data points, i.e., more shots, provide for increased definition of the shape of the standard deviation graph within the constraint of diminishing XYZ error fidelity at higher offset distances. Therefore, the number of shots in a given set of seismic source shots, and accordingly the pre-determined radial offset distance, is set to be a minimum number of shots or points to adequately define the shape of the standard deviation graph.

For a plurality of shot lines that yields a plurality of sets of seismic source shots, the statistical measure of differences yields a separate standard deviation of all differences across all shots in each set of seismic source shots between the observed direct arrival time for each shot in each set of seismic source shots and each one of the plurality of predicted direct arrival times. The result is a plurality of standard deviations equal to the number of sets of seismic source shots multiplied by the number of predicted direct arrival times (proposed node positions). These standard deviations are then combined using a weighted average standard deviation across all sets of seismic source shots for each of the proposed node positions. Each set of seismic source shots has a weight equal to the number of shots in that set of seismic source shots.

In one embodiment, the statistical comparison of the observed direct arrival times for each shot in the set of seismic source shots with the plurality of predicted direct arrival times takes into account the nearest offset shot in each shot line or each set of seismic source shots. Alternatively, the reference could be chosen anywhere along the shot line provided that the chosen reference is related to the direct arrival and not some other factor in the seismic data such as a refractor or water bottom multiple. This nearest offset shot is different for each set of seismic source shots and may also be different for each of the plurality of proposed positions as change in position equals change in offset used in the time difference determination. This does not result in redefining the statistical analysis range of shots. Therefore, a nearest offset shot is identified for each set of seismic source shots. A difference between the observed direct arrival time for each shot and each one of the plurality of predicted directed arrival times is calculated with reference to this nearest offset shot. This use of a unique reference for each shot line and each proposed node position facilitates the decoupling of distortions arising from node position error from other distortions such as clock-drift.

For example, in one embodiment, a time difference, dT, is calculated between each observed direct arrival time, $T_{S_i}$, for a given shot, $S_i$, and the predicted direct arrival time with the node positioned as reported at time of deployment/recovery, $T_{S_i}^{P_o}$. This difference, $dT = T_{S_i} - T_{S_i}^{P_o}$, describes the time error arising from node position error and other time errors such as clock drift. In the absence of any errors it would be zero and could be described as flat (after time reduction i.e. linear move-out) across all shots and shot lines as shown in top left graph 112 of FIG. 1. In the absence of position error and in the presence of clock-drift etc., this difference is zero within a shot line but non-zero shot line to shot line. With both position and clock-drift etc., this difference is non-zero within each shot line and shot line to shot line. By taking the nearest offset shot predicted direct arrival time for each and every shot line, $T_{S_{near}}^{P_o}$, then $dT = (T_{S_i} - T_{S_i}^{P_o}) - T_{S_{near}}^{P_o}$ is zero (i.e. "flat") shot line to shot line in the presence of clock-drift etc. but remains non-zero within each shot line when position errors are present. Extending this for a predicted direct arrival time for a plurality of proposed node positions, $T_{S_i}^{P_j}$, yields $dT = (T_{S_i} - T_{S_i}^{P_j}) - T_{S_{near}}^{P_j}$. A goal is to identify the position, $P_j$, that yields $dT = 0$ for all shots on all shot lines. In another embodiment, which has some practical advantages, this difference is expressed as the variation to the original position error to give $dT = (T_{S_i} - T_{S_i}^{P_o}) + (T_{S_i} - T_{S_i}^{P_j}) - T_{S_{near}}^{P_j}$. These differences are calculated over all shots, i and all proposed locations, j across all shot lines. These resulting time differences are then used to yield the desired statistical comparison of the observed and predicted direct arrivals with reference to the nearest offset shot.

Having statistically compared the observed direct arrival times and the plurality of predicted direct arrival times, the unique proposed position that minimizes the statistical measure of differences between the observed direct arrival times and the predicted direct arrival times for each shot in the set of shots is selected as a corrected ocean bottom node position 406. When a plurality of shot lines are used, the unique position that minimizes the statistical measures of differences between the observed direct arrival times and the predicted direct arrival times across all sets of seismic source shots is selected.

The process of statistical comparison of the differences between observed and predicted direct arrival times can be repeated iteratively to improve the accuracy of the corrected location of the OBN. This can include providing additional proposed locations, providing proposed locations grouped within a smaller area or having smaller distances between each proposed location and providing proposed locations within a certain area or quadrant around the OBN. Therefore, a determination is made regarding whether another iteration is to be performed 410. In one embodiment, the number of iterations to be performed is predetermined and can be two to three iterations or more. The number of iterations can be set based on the desired degree of accuracy. The degree of accuracy of the corrected node position at the end of the final (or any) iteration is dependent on the sampling of the proposed positions considered during that iteration. If another iteration is to be performed, refined unique proposed positions of the ocean bottom node are generated 412, and the refined unique proposed positions are used to refine a location of the corrected ocean bottom node position using the refined proposed location of the ocean bottom node iteratively in the steps of the statistical comparison 404 and selection of the unique proposed position 406. When another iteration is not to be performed, the accuracy may be refined by interpolation based on the statistical measures of the proposed positions immediately surrounding the corrected position 408 to identify a minima and its corresponding position, within the locality of the corrected position identified by the preceding statistical analysis.

Exemplary embodiments determine OBN position "decoupled" from time distortions that have a moderate chronological time wavelength, i.e., longer than several hours. The OBN position is determined accurately in the presence of clock-drift or water column statics, thus enabling these other distortions, particularly clock-drift, to be satisfactorily resolved once the node position is estimated. Water column variations are more confidently determined through inclusion of OBNs in the water column static analysis that might otherwise have been excluded due to poor confidence in the field reported node position. This can be important when problem position and clock drift nodes cluster in a localized area.

A further advantage of the exemplary methods is that the direct arrival time observations do not need to be exact in the absolute sense, just appropriate to describe its "shape" in the relative sense. Also, the reference point from which the time observations can be made is flexible, e.g. from hyperbolic move-out (HMO) corrected data or from acquisition datum. Hyperbolic move-out (employed for the examples shown in FIG. 1) is often used as it is the easiest means to visualize the problem, but other reference point observations can be used. Hyperbolic move-out in the context of this invention is also often referred to as linear move-out (LMO).

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for ocean bottom node position correction in accordance with exemplary embodiments and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

Figure 4:
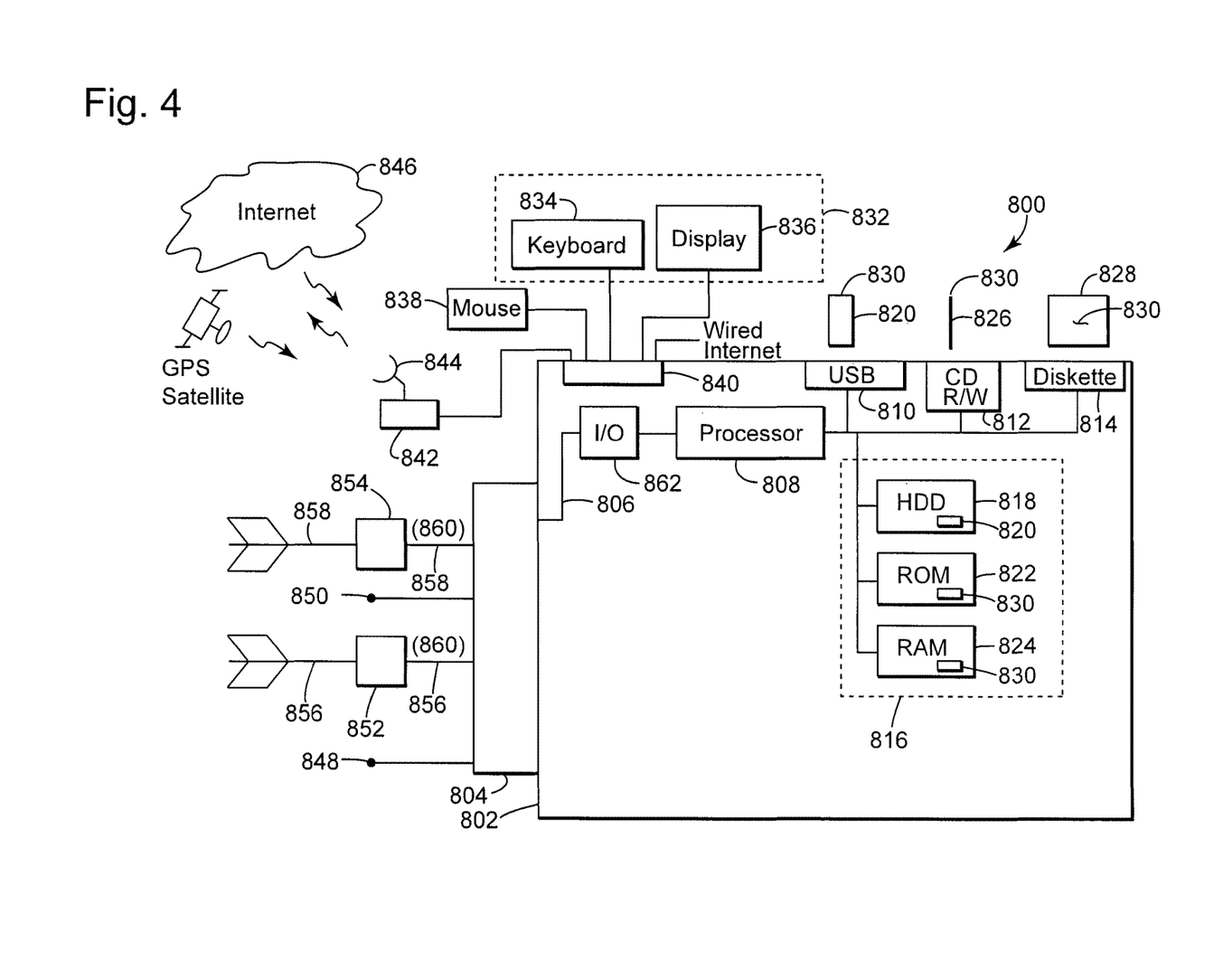
FIG. 4 illustrates an exemplary data processing device or system which can be used to implement the methods.

In one embodiment, a computing device for performing the calculations as set forth in the above-described embodiments may be any type of computing device capable of processing and communicating seismic data associated with a seismic survey. An example of a representative computing system capable of carrying out operations in accordance with these embodiments is illustrated in FIG. 4. System 800 includes, among other items, server 802, source/receiver interface 804, internal data/communications bus (bus) 806, processor(s) 808, universal serial bus (USB) port 810, compact disk (CD)/digital video disk (DVD) read/write (R/W) drive 812, floppy diskette drive 814 (though less used currently, many servers still include this device), and data storage unit 816.

Data storage unit 816 itself can comprise hard disk drive (HDD) 818 (these can include conventional magnetic storage media, but, as is becoming increasingly more prevalent, can include flash drive-type mass storage devices 820, among other types), ROM device(s) 822 and random access memory (RAM) devices 824. Usable with USB port 810 is flash drive device 820, and usable with CD/DVD R/W device 812 are CD/DVD disks 826 (which can be both read and write-able). Usable with diskette drive device 814 are floppy diskettes 828. Each of the memory storage devices, or the memory storage media (818, 820, 822, 824, 826, and 828, among other types), can contain parts or components, or in its entirety, executable software programming code (software) 830 that can implement part or all of the portions of the method described herein. Further, processor 808 itself can contain one or different types of memory storage devices (most probably, but not in a limiting manner, RAM memory storage media 824) that can store all or some of the components of software 830.

In addition to the above-described components, system 800 also includes user console 832, which can include keyboard 834, display 836, and mouse 838. All of these components are known to those of ordinary skill in the art, and this description includes all known and future variants of these types of devices. Display 836 can be any type of known display or presentation screen, such as liquid crystal displays (LCDs), light emitting diode displays (LEDs), plasma displays, cathode ray tubes (CRTs), among others. User console 832 can include one or more user interface mechanisms such as a mouse, keyboard, microphone, touch pad, touch screen, voice-recognition system, among other interactive inter-communicative devices.

User console 832, and its components if separately provided, interface with server 802 via server input/output (I/O) interface 840, which can be an RS232, Ethernet, USB or other type of communications port, or can include all or some of these, and further includes any other type of communications means, presently known or further developed. System 800 can further include communications satellite/global positioning system (GPS) transceiver device 842, to which is electrically connected at least one antenna 844 (according to an embodiment, there would be at least one GPS receiver-only antenna, and at least one separate satellite bi-directional communications antenna). System 800 can access the Internet 846, either through a hard-wired connection, via I/O interface 840 directly, or wirelessly via antenna 844, and transceiver 842.

Server 802 can be coupled to other computing devices, such as those that operate or control the equipment, via one or more networks. Server 802 may be part of a larger network configuration as in a global area network (GAN) (e.g., Internet 846), which ultimately allows connection to various landlines.

According to a further embodiment, system 800, being designed for use in seismic exploration, will interface with one or more sources 848, 850 and one or more receivers 852, 854. As further previously discussed, sources 848, 850 and receivers 852, 854 can communicate with server 802 either through an electrical cable, or via a wireless system that can communicate via antenna 844 and transceiver 842 (collectively described as communications conduit 860).

According to further exemplary embodiments, user console 832 provides a means for personnel to enter commands and configuration into system 800 (e.g., via a keyboard, buttons, switches, touch screen and/or joy stick). Display device 836 can be used to show: source/receiver 856, 858 position; visual representations of acquired data; source 848, 850 and receiver 852, 854 status information; survey information; and other information important to the seismic data acquisition and processing process. Source and receiver interface unit 804 can receive the seismic data from receiver 852, 854 though communication conduit 860 (discussed above). Source and receiver interface unit 804 can also communicate bi-directionally with sources 848, 850 through the communication conduit 860. Excitation signals, control signals, output signals and status information related to source 848, 850 can be exchanged by communication conduit 860 between system 800 and source 848, 850.

System 800 can be used to implement the methods described above associated with the calculation of the corrected node position. Hardware, firmware, software or a combination thereof may be used to perform the various steps and operations described herein. According to an exemplary embodiment, software 830 for carrying out the above-discussed steps can be stored and distributed on multimedia storage devices.

The disclosed exemplary embodiments provide a computing device, software and method for calculating the corrected node position. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for ocean bottom node position correction, the method comprising:
   using seismic data recorded on an ocean bottom node to determine observed direct arrival times at the ocean bottom node from a set of seismic source shots comprising a time span that is only a portion of an entire span time for a shot line containing the set of seismic source shots;
   comparing the observed direct arrival times for each shot in the set of seismic source shots statistically with a plurality of predicted direct arrival times for each shot in the set of seismic source shots to derive a statistical measure of differences across all shots, each predicted direct arrival time associated with a unique proposed position of the ocean bottom node; and
   selecting the unique proposed position that minimizes the statistical measure of differences between the observed direct arrival times and the predicted direct arrival times for each shot in the set of shots as a corrected ocean bottom node position.

2. The method of claim 1, wherein the method further comprises selecting the set of seismic source shots such that all shots in the set of seismic source shots are located within a pre-determined distance from the ocean bottom node.

3. The method of claim 2, wherein the method further comprises setting the pre-determined distance empirically based on a depth of water in which the ocean bottom node is located.

4. The method of claim 2, wherein the method further comprises setting the pre-determined distance to obtain a number of shots in the set of seismic source shots sufficient to express a sufficient statistical measure of differences across all shots.

5. The method of claim 1, wherein the statistical measure of differences comprises a standard deviation of all differences across all shots in the set of seismic source shots between the observed direct arrival time for each shot in the set of seismic source shots and each one of the plurality of predicted direct arrival times.

6. The method of claim 5, wherein comparing the observed direct arrival times for each shot in the set of seismic source shots statistically with the plurality of predicted direct arrival times further comprises:
   identifying a nearest offset shot in each set of seismic source shots, the nearest offset shot comprising a shortest distance to the ocean bottom node; and
   computing each difference between the observed direct arrival time for each shot and each one of the plurality of predicted direct arrival times with reference to the nearest offset shot.

7. The method of claim 6, wherein computing each difference with reference to the nearest offset shot comprises calculating a time difference between each observed direct arrival time and each predicted direct arrival time then computing the difference relative to the nearest offset shot direct arrival time before computing the statistical measure for each one of the plurality of predicted direct arrival times.

8. The method of claim 1, wherein each unique position comprises two orthogonal co-planar coordinates.

9. The method of claim 8, wherein the two orthogonal co-planar coordinates comprise polar coordinates.

10. The method of claim 8, wherein each unique position further comprises a third coordinate orthogonal to a plane containing the two orthogonal co-planar coordinates.

11. The method of claim 10, wherein the third coordinate represents a vertical coordinate and includes a component expressing an average velocity through a water column in which the ocean bottom node is located.

12. The method of claim 10, wherein the third coordinate represents a vertical coordinate and includes a component expressing a depth dependent velocity through a water column in which the ocean bottom node is located.

13. The method of claim 1, further comprising:
generating refined unique proposed locations of the ocean bottom node, and
refining the corrected ocean bottom node position using the refined proposed locations of the ocean bottom node iteratively in the steps of comparing the observed direct arrival times and selecting the unique proposed position.

14. The method of claim 1, further comprising refining a location of the corrected ocean bottom node position by interpolation based on the statistical measure of differences from a group of unique proposed positions in a vicinity of the corrected ocean bottom node position.

15. The method of claim 1, wherein:
the using of the seismic data further comprises using the seismic data recorded by the ocean bottom node to determine observed direct arrival times at the ocean bottom node from another set of seismic source shots, the other set being derived from another shot line among a plurality of shot lines;
the comparing of the observed direct arrival times with the plurality of predicted direct arrival times statistically further comprises deriving another statistical measure of differences across shots of the other set of seismic source shots; and
the selecting of the unique proposed position further comprises selecting the unique position that minimizes the statistical and the other statistical measures of differences between the observed direct arrival times and the predicted direct arrival times across seismic source shots in the set of seismic shots and the other set of seismic shots.

16. The method of claim 15, wherein the method further comprises selecting the set of seismic source shots such that all shots are within a first pre-determined distance from the ocean bottom node, and selecting the other set of seismic source shots such that all other shots are within a second pre-determined distance from the ocean bottom node.

17. The method of claim 16, wherein the first and second pre-determined distances define desired geometric shapes around the ocean bottom node, each shot line in the plurality of shot lines traversing a distinct path through the desired geometric shape.

18. The method of claim 16, wherein:
the plurality of shot lines comprise parallel lines; and
a number of shots in the set and the other set of seismic source shots varies with distance from the ocean bottom node along a cross line extending perpendicular to the plurality of shot lines.

19. The method of claim 15, wherein
the statistical measure of differences comprises a standard deviation of all differences across all shots in the set of seismic source shots between the observed direct arrival times and the respective predicted direct arrival times, and the other statistical measure of differences comprises another standard deviation of all differences across all shots in the other set of seismic source shots between the other observed direct arrival times and the other respective predicted direct arrival times; and
a weighted average standard deviation across the set and the other set of seismic source shots weighs the standard deviation and the other standard deviation according to a number of shots in the set of seismic source shots and the other set of seismic source shots respectively.

20. A computer-readable storage medium containing a computer-readable code that when read by a computer causes the computer to perform a method for ocean bottom node position correction, the method comprising:
using seismic data recorded on an ocean bottom node to determine observed direct arrival times at the ocean bottom node from a set of seismic source shots comprising a time span that is only a portion of an entire span time for a shot line containing the set of seismic source shots;
comparing the observed direct arrival times for each shot in the set of seismic source shots statistically with a plurality of predicted direct arrival times for each shot in the set of seismic source shots to derive a statistical measure of differences across all shots, each predicted direct arrival time associated with a unique proposed position of the ocean bottom node; and
selecting the unique proposed position that minimizes the statistical measure of differences between the observed direct arrival times and the predicted direct arrival times for each shot in the set of shots as a corrected ocean bottom node position.

* * * * *